United States Patent
Virmani et al.

(10) Patent No.: US 9,244,698 B2
(45) Date of Patent: Jan. 26, 2016

(54) DOWNLOAD BAR USER INTERFACE CONTROL

(75) Inventors: Ritika Virmani, Seattle, WA (US); Jane T. Kim, Seattle, WA (US); Warren G. Stevens, Redmond, WA (US); Dave Risney, Kirkland, WA (US); Todd Sahl, Redmond, WA (US); Andrew E. Olson, Seattle, WA (US); Sarah J. Bowers, Snohomish, WA (US); Susan Makarian, Duvall, WA (US); Clint C. Jorgenson, Carnation, WA (US); Randall K. Winjum, Vashon, WA (US); Eric M. Lawrence, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 12/881,783

(22) Filed: Sep. 14, 2010

(65) Prior Publication Data

US 2012/0066612 A1 Mar. 15, 2012

(51) Int. Cl.
*G06F 3/048* (2013.01)
*G06F 9/44* (2006.01)
*G06F 3/0481* (2013.01)

(52) U.S. Cl.
CPC ............ *G06F 9/4443* (2013.01); *G06F 3/0481* (2013.01)

(58) Field of Classification Search
USPC ......................................................... 715/748
See application file for complete search history.

(56) References Cited

U.S. PATENT DOCUMENTS 6,769,019 B2 * 7/2004 Ferguson ...................... 709/219
7,779,035 B2 8/2010 Raciborski et al.

(Continued)

FOREIGN PATENT DOCUMENTS

CN 1871589 11/2006
WO 0063804 A1 10/2000

(Continued)

OTHER PUBLICATIONS

Internet Download Manager Help Guide published by Tonec Inc. p. 1-3, published Aug. 5, 2008, p. 4-5, published Jun. 9, 2008 , and p. 6-13 published Jun. 7, 2008.*

(Continued)

*Primary Examiner* — William Bashore
*Assistant Examiner* — Hien Duong
(74) *Attorney, Agent, or Firm* — Bryan Webster; Raghu Chinagudabha; Micky Minhas

(57) ABSTRACT

Various embodiments provide a download bar user interface control that is designed to help users maintain focus on their browsing activities, while offering notifications regarding a file download. In at least some embodiments, the download bar user interface control is non-modal and is presented at a location within the browsing field-of-view that is selected to reduce user distraction. Various embodiments also provide a download manager user interface that enables multiple download-related tasks to be performed. In at least some embodiments, the download manager user interface is presented responsive to input to the download bar user interface control. Further to some embodiments, the download bar user interface control can be closed responsive to the download manager user interface being presented and download-related notifications and options transferred from the download bar user interface control to the download manager user interface.

20 Claims, 16 Drawing Sheets

(56) References Cited

U.S. PATENT DOCUMENTS

| | | | |
|---|---|---|---|
| 2006/0031785 | A1 | 2/2006 | Raciborski |
| 2006/0277478 | A1* | 12/2006 | Seraji et al. ................... 715/760 |
| 2007/0094731 | A1* | 4/2007 | Teodosiu et al. ................ 726/24 |
| 2007/0162611 | A1 | 7/2007 | Yu et al. |
| 2007/0204011 | A1* | 8/2007 | Shaver et al. ................. 709/219 |
| 2007/0208829 | A1 | 9/2007 | Kim et al. |
| 2007/0220590 | A1* | 9/2007 | Rasmussen et al. ............... 726/4 |
| 2008/0201401 | A1* | 8/2008 | Pugh et al. .................... 709/201 |
| 2009/0157794 | A1* | 6/2009 | Sheshadri et al. ............ 709/202 |
| 2009/0282485 | A1* | 11/2009 | Bennett ........................... 726/24 |
| 2011/0214018 | A1* | 9/2011 | Vidal et al. ...................... 714/25 |

FOREIGN PATENT DOCUMENTS

| | | |
|---|---|---|
| WO | 0127824 A1 | 4/2001 |
| WO | WO-0127824 | 4/2001 |

OTHER PUBLICATIONS

Firefox Internet Explorer version 3.0 working screen shots. Jun. 17, 2008. 23 pages.*

Modify Firefox Download Manger with Download Manager Tweak. by Asian Angel. Aug. 26, 2009. 5 pages.*

The Complete Idio's Guide to Google Chrome and Chrome OS, by Paul McFedries. Published Aug. 1, 2010 by Alpha Books. 3 pages.*

"User Notifications and Alerts", Retrieved at >>https://developer.mozilla.org/en/XUL_School/User_Notitications_and_Alerts>> Apr. 6, 2010, pp. 4.*

"Automate your download from File Hosting Sites with Mipony", Retrieved from: <http://dotnetwizard.net/soft-apps/automate-your-download-from-file-hosting-sites-with-mipony/> Aug. 18, 2010, (Nov. 17, 2009),5 pages.

"Google Chrome Downloads: Downloading a file", Retrieved from: <http://www.google.com/support/chrome/bin/answer.py?hl=en&answer=95759> on Aug. 18, 2010 1 page.

Ilascu, Ionut "Add A Torrent Twist", *Softpedia*, Available at <http://news.softpedia.com/newsPDF/Torrent-61834.pdf>,(Aug. 3, 2007),2 pages.

Jensen, Devon "Add-ons for Firefox: Download Statusbar 0.9.7", Retrieved from: <https://addons.mozilla.org/en-US/firefox/addon/26/> on Aug. 18, 2010, (Jul. 13, 2010),6 pages.

"Foreign Office Action", Chinese Application No. 201110270961.0, (Apr. 28, 2013), 10 pages.

"How to use Internet Download Manager", Retrieved from <http://www.internetdownloadmanager.com/support/using_idm/using_idm.html> on Apr. 21, 2013, (Dec. 31, 2008), 17 pages.

"International Search Report", Mailed Date: Apr. 27, 2012, Application No. PCT/US2011/049811, Filed Date: Aug. 31, 2011, pp. 8.

"Foreign Office Action", CN Application No. 201110270961.0, Nov. 25, 2013, 7 pages.

"European Search Report", EP Application No. 11825662.7, Feb. 10, 2014, 9 Pages.

Anjum, "How to Easily View and Manage Downloads From Status Bar in Firefox", www.smashingapps.com/2010/05/14/how-to-easily-view-and-manage-down loads-from-status-bar-in-firefox.html Retrieved on Jan. 31, 2014, May 14, 2010, 4 Pages.

"Foreign Office Action", CN Application No. 201110270961.0, May 4, 2014, 10 Pages.

"Foreign Office Action", CN Application No. 201110270961.0, Oct. 31, 2014, 13 pages.

"Foreign Office Action", CN Application No. 201110270961.0, Jun. 2, 2015, 19 Pages.

* cited by examiner

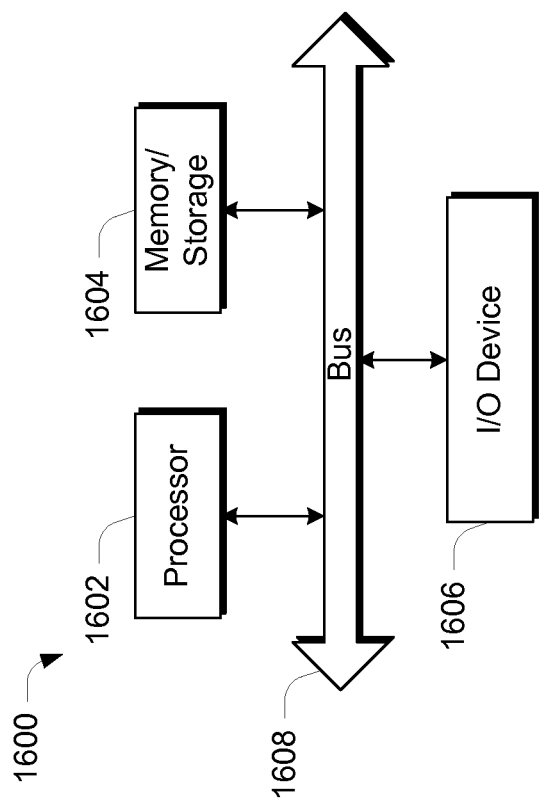

DOWNLOAD BAR USER INTERFACE CONTROL

BACKGROUND

Notifications that are generated in the context of a web browser tend to be modal notifications in the form of a dialog that blocks the user from their browsing task. Specifically, notifications regarding downloads tend to be presented in the primary field of view, overlay and block content and, because of their modal nature, force a user to take some action before being able to return to their browsing task.

These types of notifications can be distracting and annoying for many users. Moreover, requiring a user to take an action before allowing them to return to the browsing task can degrade the user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a download bar user interface control that is designed to help users maintain focus on their browsing activities, while offering notifications regarding a file download. In at least some embodiments, the download bar user interface control is non-modal and is presented at a location within the browsing field-of-view that is selected to reduce user distraction. Various embodiments also provide a download manager user interface that enables multiple download-related tasks to be performed. In at least some embodiments, the download manager user interface is presented responsive to input to the download bar user interface control. Further to some embodiments, the download bar user interface control can be closed responsive to the download manager user interface being presented and download-related notifications and options transferred from the download bar user interface control to the download manager user interface.

BRIEF DESCRIPTION OF THE DRAWINGS

The same numbers are used throughout the drawings to reference like features.

FIG. 16 illustrates an example system that can be used to implement one or more embodiments.

DETAILED DESCRIPTION

Overview

Figure 1:
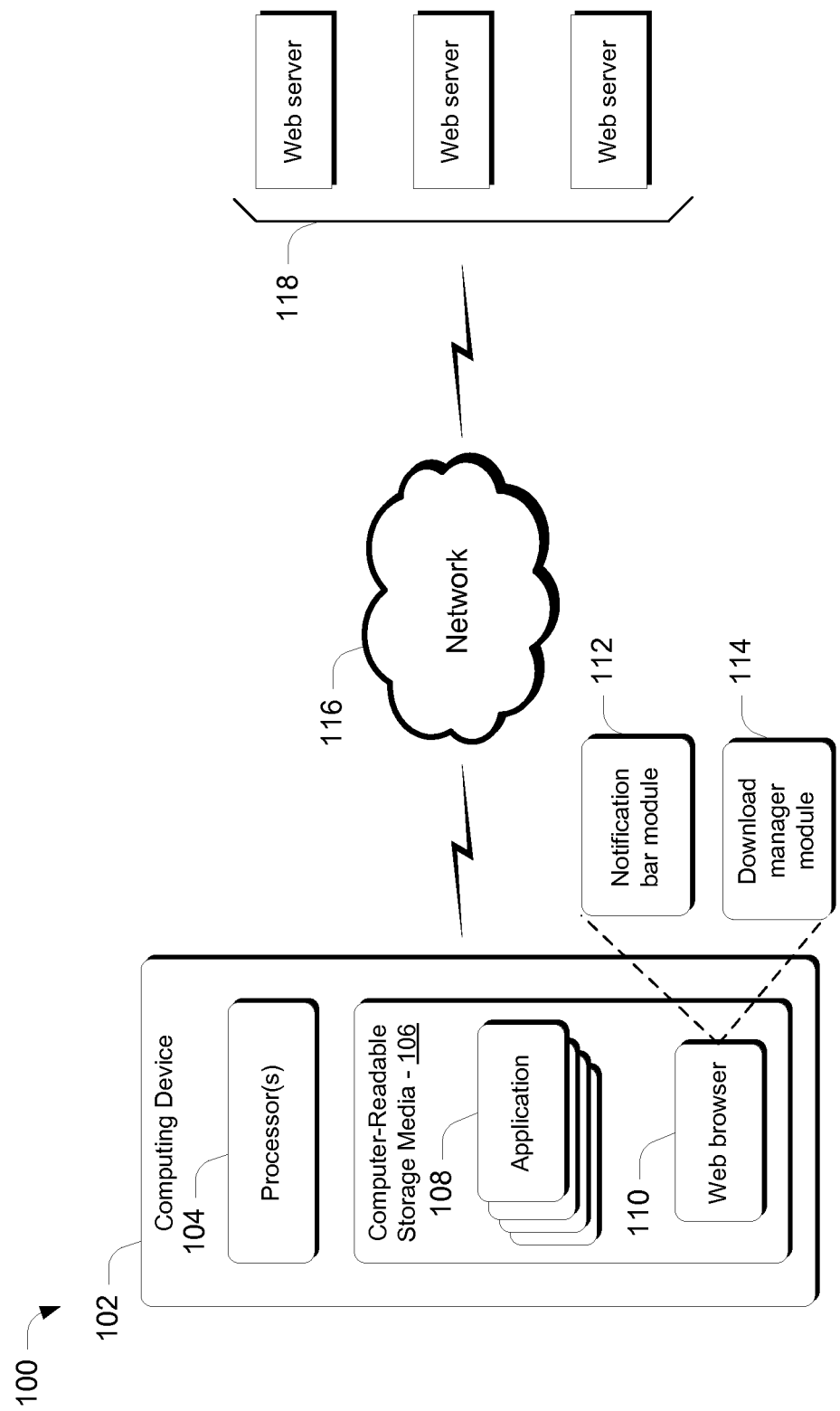
FIG. 1 illustrates an operating environment in which various principles described herein can be employed in accordance with one or more embodiments.

Various embodiments provide a notification bar user interface control, also referred to as a "notification bar," that is designed to help users maintain focus on their browsing activities, while offering notifications in the form of suggestions. In at least some embodiments, the notification bar user interface control is non-modal and is presented at a location within the browsing field-of-view that is selected to reduce user distraction. For example, in the embodiments described below, the notification bar is presented at or near the bottom of a web browser's user interface. The notification bar is designed to be noticeable yet ignorable, thus enabling a user to continue with their browsing tasks without being distracted by a modal dialog. Further, in at least some embodiments, the notification bar user interface control is presented in a manner which overlays content of the web page, and thus does not cause layout of the web page to be changed.

In some embodiments, the notification bar can be used to present notifications regarding downloads and to allow a user to perform various actions regarding downloads. For purposes of the discussion herein, such embodiments of the notification bar can be implemented as a download bar user interface control, also referred to herein as a "download bar." While at least some embodiments of the download bar share the various characteristics and attributes of the notification bar discussed above and below, the download bar is also designed to enable users to view status messages regarding downloads and to perform certain actions related to downloads.

In an example implementation, when a user chooses to download a file (e.g., by clicking on a link included as part of a web page), the download bar can display a status message regarding the progress of the file download. The download bar can also enable the user to perform actions regarding the file download, such as pausing the download process, cancelling the download process, saving and/or running the file upon completion of the download process, and so on.

As a further aid in assisting users with various download-related information and actions, various embodiments utilize a download manager. In at least some embodiments, the download manager can include a download manager user interface that lists pending downloads, the progress of file downloads currently in progress, and tracks the status of files that have been previously downloaded. The download manager user interface can also enable a user to interact with a file download process and to perform actions relating to the download process and/or a file that has been previously downloaded. In at least some embodiments, the download manager user interface can be accessed via the download bar. For example, a user can select a selectable control on the download bar to cause the download manager user interface to be presented.

In some embodiments, the progress of a file download can be viewed via either the download bar or the download manager user interface. For example, a user can choose to download a file and the download bar can be populated with information regarding the progress of the file download process. The download manager user interface can then be launched (e.g., via a selectable control included as part of the download bar) and can display information regarding the progress or the file download process and/or provide options to the user for downloading the file, e.g., save, run, cancel, and so on. Thus, the download bar can present information and options regarding a file download without causing the user to switch focus from the user's browsing activities. If the user then wants to view more information regarding the file download and/or other file downloads, the user can launch, view, and interact with the download manager user interface. This provides a user with the options of the less intrusive experience of the download bar or the comprehensive information provided by the download manager user interface.

In the discussion that follows, a section entitled "Operating Environment" is provided and describes one environment in which one or more embodiments can be employed. Following this, a section entitled "Example Notification Bar" describes an example notification bar in accordance with one or more embodiments. This section includes multiple subsections that describe various features in accordance with one or more embodiments. Next, a section entitled "Download Management Interfaces" describes example interfaces that can be used to manage downloads in accordance with one or more embodiments. Following this, a section entitled "Example Methods" describes example methods in accordance with one or more embodiments. Last, a section entitled "Example System" describes an example system that can be utilized to implement one or more embodiments.

Operating Environment

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 16.

In addition, computing device 102 includes a software application in the form of a web browser 110 that includes or otherwise makes use of a notification bar module 112 that operates as described above and below. The notification bar module provides a notification bar that is designed to help users maintain focus on their browsing activities, while offering notifications in the form of suggestions. In at least some embodiments, the notification bar is non-modal and is presented at a location within the browsing field-of-view that is selected to reduce user distraction. Further, in at least some embodiments, the notification bar user interface control is presented in a manner which overlays content of the web page and thus, does not cause layout of the web page to be changed.

The web browser 110 also includes or otherwise makes use of a download manager module 114 that operates as described above and below. The download manager module can manage previously downloaded files, currently pending downloads, and files that are in the process of being downloaded. In at least some embodiments, the download manager module can interact with the notification bar module to provide download-related information (e.g., via a download bar discussed above and below). Further, in at least some embodiments, the download manager module can be associated with a download manager user interface that enables a user to view information about downloads and select download-related actions.

In at least some embodiments, the download manager user interface can serve as a history of previous downloads and/or an interface whereby a user can select from options associated with pending downloads and/or downloads in progress. The download manager user interface can also track information such as a download URL, a web page that referred the download, a domain associated with the download, a publisher of the download, and the results of security checks associated with the download.

In addition, environment 100 includes a network 116, such as the Internet, and one or more web servers 118 from and to which content can be received (e.g., downloaded) and sent, as described above and below. Such content can include web pages, files, and so on that are received from the web servers.

Computing device 102 can be embodied as any suitable computing device such as, by way of example and not limitation, a desktop computer, a portable computer, a handheld computer such as a personal digital assistant (PDA), cell phone, and the like.

Having described an example operating environment, consider now a discussion of some example embodiments that can utilize notification bar module 112.

Example Notification Bar

Figure 2:
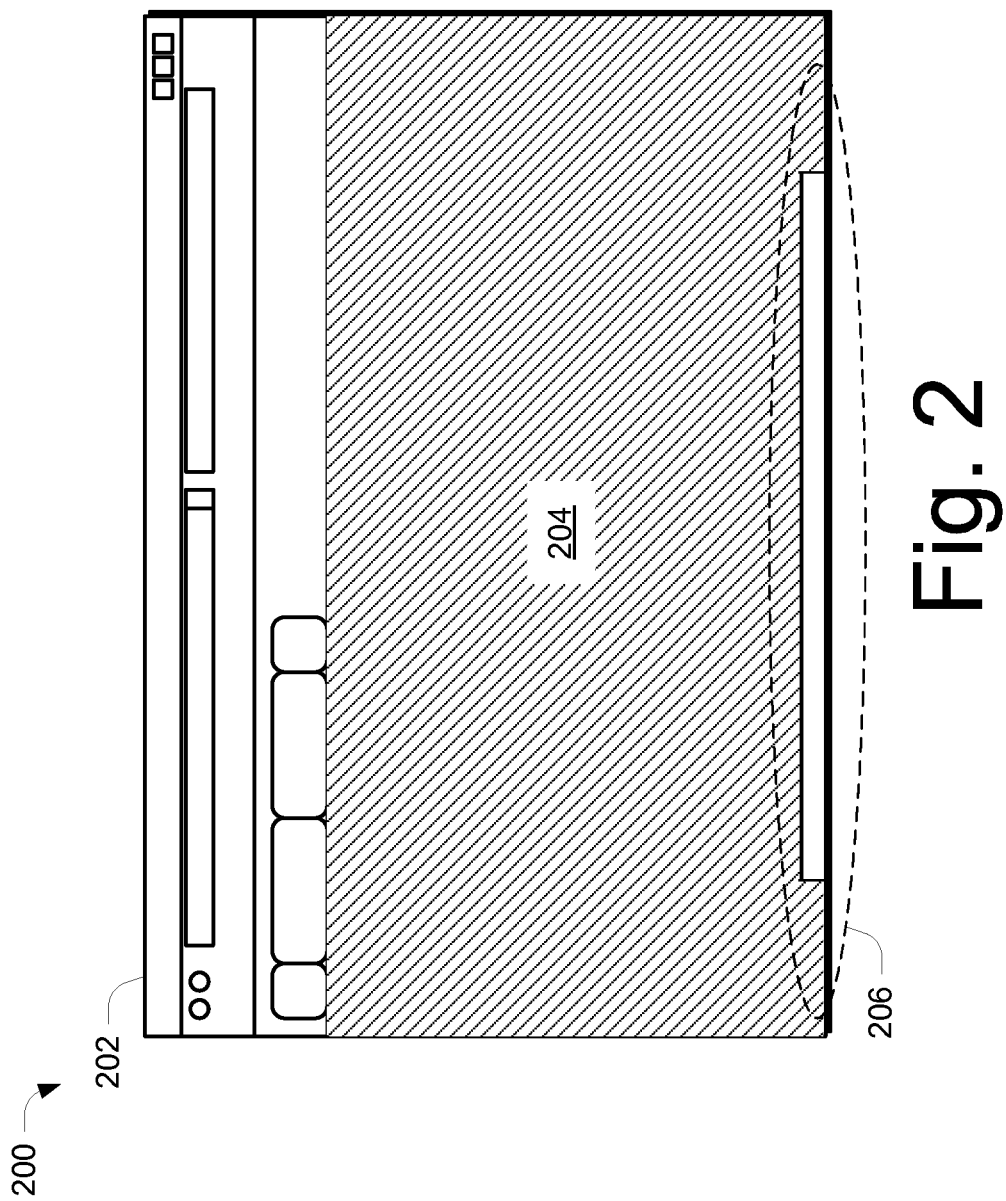
FIG. 2 illustrates an example web browser in accordance with one or more embodiments.

FIG. 2 illustrates an example web browser, in accordance with one or more embodiments, generally at 200. Web browser 200 includes a web browser user interface 202 which includes typical instrumentalities such as back and forward navigation buttons, an address bar, a search bar, and a tab band that can support multiple tabs, all of which are undesignated. The web browser user interface also includes a content rendering area 204 (designated by the cross hatching) in which content can be rendered. In addition, web browser user interface 202 includes a notification bar 206. In one or more embodiments, the notification bar is designed to help users maintain focus on their browsing activities, while offering notifications in the form of suggestions.

In at least some embodiments, the notification bar is non-modal and is presented at a location within the browsing field-of-view that is selected to reduce user distraction. For example, in the illustrated and described embodiment, the notification bar is presented as an overlay at or near the bottom of the web browser's user interface—here adjacent the bottom of or below content rendering area 204. The notification bar is designed to be noticeable yet ignorable, thus enabling a user to continue with their browsing tasks in content rendering area 204, without being distracted by a modal dialog. Further, in at least some embodiments, the notification bar user interface control is presented in a manner which overlays content of the web page and thus, does not cause layout of the web page to be changed. Thus, the notification bar's location effectively prioritizes content that is rendered within content rendering area 204 over a particular notification that might appear in the notification bar.

Figure 3:
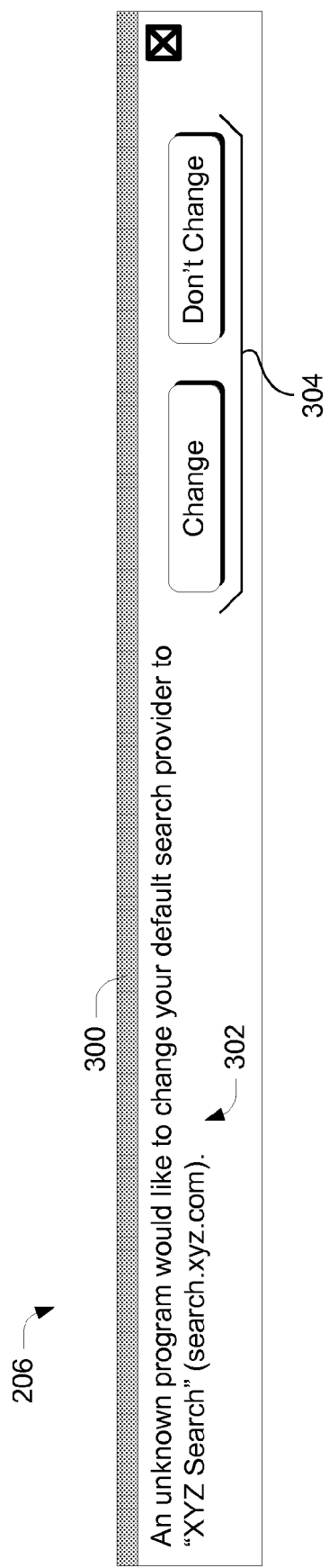
FIG. 3 illustrates a notification bar in more detail in accordance with one or more embodiments.

FIG. 3 illustrates notification bar 206 in more detail, in accordance with one or more embodiments. In this example, notification bar 206 includes a color bar 300 that extends horizontally across the notification bar, a textual notification area 302, and, optionally, one or more user-selectable instrumentalities such as the illustrated buttons shown generally at 304, and/or one or more links.

With respect to the color bar 300, consider the following. In one or more embodiments, the design of the notification bar, including the color bar 300, is intended to be more browser-centric than website-centric. Specifically, the notification bar is designed so that visually, it appears to have originated from the browser or operating system and not from a website. To this end, the color of the color bar can be selected to have a color scheme that is similar to or the same as the color scheme of notifications that emanate from the operating system or the web browser. Accordingly, any suitable color can be selected as the color of the color bar 300. Further, the color bar can also serve to visually separate notifications that appear in the notification bar and the content that is rendered in the content rendering area 204 (FIG. 2).

With respect to the textual notification area 302, any suitable type of and not limitation, security notifications, notifications associated with file download operations, notifications associated with saving user information, notifications associated with remembering items that are typed into web-based forms, notifications associated with privacy decisions, and the like.

Having considered an example notification bar in accordance with one or more embodiments, consider now some additional features that can be provided in accordance with one or more embodiments. Each of the features appears under its own separate subheading.

Format

Recall that one of the characteristics of the notification bar is that it has been designed in such a way to reduce distractions and interruptions and allow users to continue their browsing and focus on websites. In the past, browsers would tend to present modal dialogues that would force a user to take an action before allowing them to return to their browsing activities. To this end, in one or more embodiments, the web browser can now automatically make decisions that were formerly made by users, and utilize the notification bar to provide suggestions with respect to decisions that are automatically made by the web browser. For example, the web browser can make decisions, by default that is intended to keep the user and/or web browser secure. The notification bar can be utilized to enable the user to opt out of the decision that is made by the web browser.

For example, in the past in at least some web browsers, notifications were provided in the context of so-called mixed content. Specifically, if a user opted to view content that was both secure and unsecure, a modal dialog would be presented informing the user of the presence of both secure and unsecure content and asking the user if they wanted to continue viewing the content. In one or more embodiments, a decision can be automatically made by the web browser to keep the web browser secure. The notification bar can then be used to ask the user whether they wish to download the unsecure content. Doing so, in these embodiments, removes a performance task from the user by having the web browser automatically default to a secure mode. The user can, as appropriate, still choose to act on the suggestion that appears in the notification bar. Alternately, the user can choose to ignore the suggestion that appears in the notification bar.

Avoiding Page Re-Sizing

In some instances in the past, notifications such as so-called "information bar" notifications would change the layout area and cause the webpage rendered by the web browser to be re-sized or re-laid out. This could take time depending on the complexity of a particular webpage. In one or more embodiments, a performance improvement is achieved by overlaying the notification bar within the content rendering area rather than, and without resizing the webpage.

Z-Order

As will be appreciated by the skilled artisan, content that is rendered within a webpage can have a so-called z-order. The z-order defines the stack order of elements that appear in a webpage. An element with a higher stack order or z-order will appear in front of elements with lower stack orders or z-orders. In one or more embodiments, the z-order of the notification bar is higher than the z-order of elements that appear in a webpage. This prevents web content from drawing on top of the notification bar.

Multiple Bars

In at least some embodiments, in order to maintain a clean user experience, a single notification bar is shown at any one time. In a situation where multiple notifications might apply, notification bars can be queued up so that once one is presented and addressed or removed from context, the next notification bar can be shown.

In one or more embodiments, in the context of multiple notification bars, a decision to display a particular notification bar can be made in accordance with a priority that is assigned to a particular notification bar. For example, notification bars that are user initiated can be given a high priority than other notification bars. As an example, when a user chooses to download a file, notification bars associated with this action (e.g., the download bar discussed above and below) are given priority over other notifications. Notification bars that are actionable and which could improve a user's browsing experience substantially, can be given a next lower priority. In addition, other notifications that have a tendency to be less interacted with by users can be given lower priorities. Essentially then, if a notification bar is currently presented and a new, higher-priority notification is warranted due to some encountered situation, such as a new file download, the new, higher-priority notification can be presented in front of the current notification bar.

One consideration associated with assigning priorities can include historical knowledge of those notifications that users tend to interact with more rather than less. Those notifications that tend to be interacted with more by users, can be given a higher priority than less interacted-with notifications.

Persistence Model

In one or more embodiments, notification bars can persist beyond a single navigation in contexts where it makes sense to persist them across navigations. That is, sometimes a website can cause a redirection to another page. In this instance, the notification bar can persist across these redirections if contextually appropriate. This can allow users to continue tasks that they initiated and accept a notification bar's suggestion a little later at a time of their convenience. For example, assume that a user logs onto their web-based e-mail account. Responsive to logging onto their e-mail account, they might be presented with a notification bar that asks whether the user wishes to have their password saved. The user might then click on their inbox and respond to a received e-mail. After responding to an e-mail, the user might then decide to act upon the notification bar's suggestion. Note that in this example the notification bar has persisted across multiple navigations. If, however, the user navigates to a context outside of their current e-mail context, the notification bar can be removed.

Notification Levels

In one or more embodiments, notifications can be provided by the notification bar in accordance with different levels, depending on the context of the web browser and/or navigation activities. As an example, in at least some embodiments, notifications can come at three different levels—a frame level, a page/tab level, and a security domain level.

Notifications that occur at the frame level are not specific to any particular tab to which a user may have navigated. For example, if a user deletes their browsing history, then a notification might be presented indicating that the browsing history has been deleted. These notifications can be seen across tabs while browsing in the current window.

Notifications that appear at the page/tab level have context with respect to a page or a tab to which the user has navigated. For example, if a user has navigated to a particular page to log into one of their accounts, a notification bar might be presented to include a notification that asks if the user would like to have their password saved for the account.

Notifications that appear with respect to the security domain level can be specific to particular domain associated with the user navigation. For example, if the user navigates to XYZ.com and chooses to download a particular file via a download acceptance notification bar, the user has made a trust decision associated with that domain. If, for some reason, the user or website navigates to a different website or changes domains, then their previous trust decision may no longer be based on their initial navigation where the download was initiated. Accordingly, the download acceptance notification bar can be removed to reduce the chance that the user would be tricked into making a trust decision associated with the new, wrong domain.

Resizing the Window

In one or more embodiments, if a web browser window is resized for some reason, an effort is made to not truncate the notification bar so as to obscure the notification. That is, the notification bar will, for a period of time as the web browser window is resized, grow vertically, horizontally, or in any suitable direction in an effort to not remove the text or content. There is however a threshold which, if exceeded, will result in truncation of user selectable buttons first, before truncation of the text of the notification. This is done so that the user will not click on a button without having textual material to read for context.

Having described various embodiments associated with notification bars, consider now an example download management interfaces in accordance with one or more embodiments.

Download Management Interfaces

In at least some embodiments, download management can be facilitated via the notification bar 206 and/or the download manager module 114. To provide for non-intrusive viewing of download status and interaction with download-related files, the notification bar can be embodied as a download bar that enables file download status to be viewed and tasks associated with the download process to be performed. In some embodiments, the download manager module 114 can include a download manager user interface that presents of view of download history and/or downloads that are currently in progress.

Figure 4:
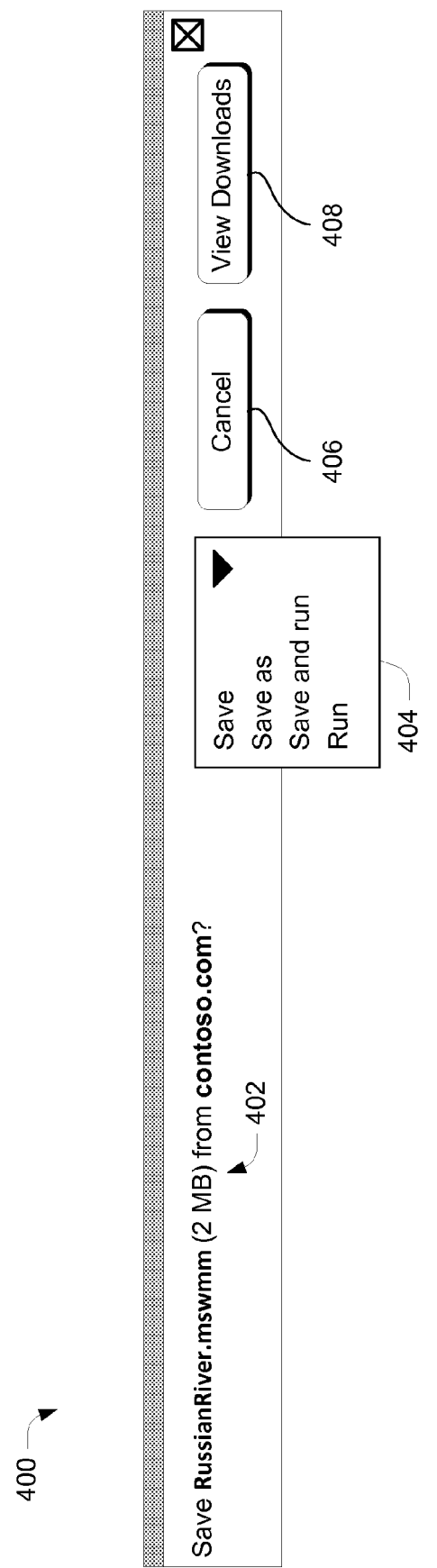
FIG. 4 illustrates a download bar in more detail in accordance with one or more embodiments.

FIG. 4 illustrates a download bar, in accordance with one or more embodiments, generally at 400. The download bar 400 includes a download notification area 402 that can be used to display various download-related notifications. Such download-related notifications can include, by way of example and not limitation, available actions for a download, a status indicator regarding a download, a security notification regarding a download, and so on. In this particular example embodiment, the download notification area 402 includes text that is asking if a user wants to save a particular file that is available to be downloaded.

The download bar 400 also includes a download options menu 404 that can be used to present a variety of download-related actions. In this particular example embodiment, the download options menu 404 presents the user with a "save" option, a "save as" option, a "save and run" option, and a "run" option. This particular list of example options is not intended to be limiting, and the download options menu 404 can be populated with a variety of different available options.

In at least some embodiments, a selection of the "save" option can cause a downloaded file to be saved to a default location. For example, a default location or a user-specified location can be specified for saving downloaded files. If the user wants to view a particular file that has been downloaded, the user can simply navigate to the file's location to view the file. In some embodiments, a selection of the "save as" option can cause a dialog window to be presented that enables the user to specify a save name for the file, a location where the file is to be saved, and so on.

According to one or more embodiments, a selection of the "save and run" option can cause a downloaded file to be saved (e.g., to the default location) and then automatically run. In some example embodiments, the "run" option can be selected to run a particular file from its source. For example, if an executable file is available for download to a computing device from a remote resource (e.g., a network share location), selection of the "run" option can cause the file to be run at the remote resource and interacted with via the computing device. This option can conserve bandwidth by not causing the entire file to be downloaded to the computing device and can conserve the local storage resources (e.g., disk space) that would be used to save a local copy of the file.

The download bar 400 also includes a cancel button 406 that, if actuated, can cause one or more actions associated with a download to be canceled. For example, pressing the cancel button 406 can cause a download that is in progress to be canceled and the file to be deleted. In at least some embodiments, pressing the cancel button 406 can cause the download bar 400 to be closed.

The download bar 400 also includes a view downloads button 408 that, if pressed, can cause a window to be displayed and that includes files that have been downloaded, files that are available for download, and/or files that are currently being downloaded. An example of such a window is a download manager user interface that is discussed above and below.

In at least some embodiments, the download bar 400 can be associated with a particular security domain. For example, if a user chooses to download a file that is associated with a web page in a particular security domain, the download bar 400 is presented and information about the download file and/or the security domain are presented in the download bar 400. If the user navigates to a different security domain (e.g., a different web page), the download of the file is cancelled, all or part of the downloaded file is deleted, and/or the download bar 400 is closed.

Figure 5:
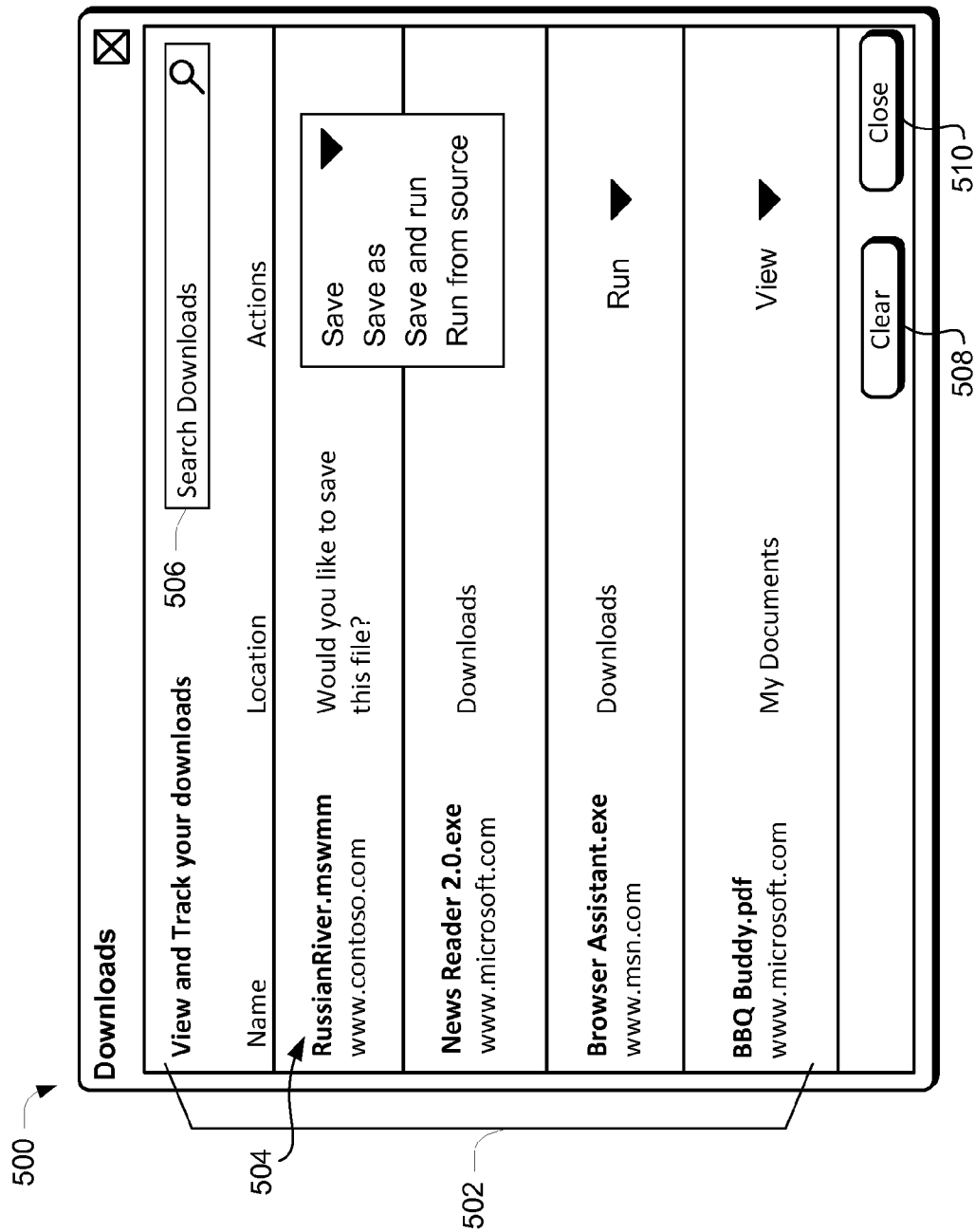
FIG. 5 illustrates a download manager user interface in accordance with one or more embodiments.

FIG. 5 illustrates a download manager user interface, in accordance with one or more embodiments, generally at 500. In at least some embodiments, the download manager user interface 500 can be displayed responsive to a selection of the view downloads button 408 discussed above with respect to the download bar 400. This is not intended to be limiting, however, and the download manager user interface can be launched in a variety of different ways, such as via a selection of an option from an options menu, automatically in response to an indication of a download, and so on. In an example implementation scenario, when the download manager user interface 500 is launched via the view downloads button 408, the download manager user interface 500 is populated with download information from the download bar 400 (e.g., a file that is available to be downloaded, a status of a file download, and so on.)

The download manager user interface 500 includes a downloads area 502 that displays various information about files that have been downloaded, file downloads that are in progress, and/or files that are available to be downloaded. The various information can include a file name, a file location, various actions that are available with respect to the files, and so on. In some embodiments, the downloads area 502 can display a history of file downloads. File names that are displayed in the downloads area 502 can be selectable to cause a particular action to occur, such as navigating to a location where the file is stored (e.g., a particular folder), causing the file to be run, causing the file to be displayed, and so on.

Included as part of the downloads area 502 are a location column and an actions column (undesignated). The location column displays a location where a download is saved or a location where a file will be saved if it is downloaded, and the actions column displays one or more download-related actions that can be performed. In this particular example embodiments, the downloads area 502 includes a file 504 that is available to be downloaded and the actions column includes a menu of selectable actions that are available with respect to the file 504.

The download manager user interface 500 also includes a search bar 506 that can be used to search available downloads and/or downloaded files. For example, downloads can be searched by file name, extension, date, and so on. Also included as part of the download manager user interface 500 is a clear button 508 and a close button 510. In some embodiments, the clear button 508 can be pressed to clear one, some, or all downloads listed in the download area 502. The close button 510 can be pressed to close the download manager user interface 500. In some embodiments, closing the download manager user interface 500 when no other web browser windows are open can cause a download that is in progress to be paused. In at least some embodiments, the download can then be resumed at a later time. The pause and resume functionalities of the download manager module 114 and the download manager user interface 500 are discussed in more detail below.

In at least some embodiments, when a download is initiated from an application other than a web browser and the download manager user interface is open, notifications and options associated with a download file are presented via the download manager user interface and not the download bar. Thus, in some embodiments, when the download manager user interface is open and a user chooses to download a file, the download bar will not be displayed. In some embodiments, however, if a download is in progress when the download manager user interface is open and the download manager user interface is subsequently closed while the download is still in progress, the download bar can be displayed and download-related notifications and options are presented via the download bar.

Figure 6:
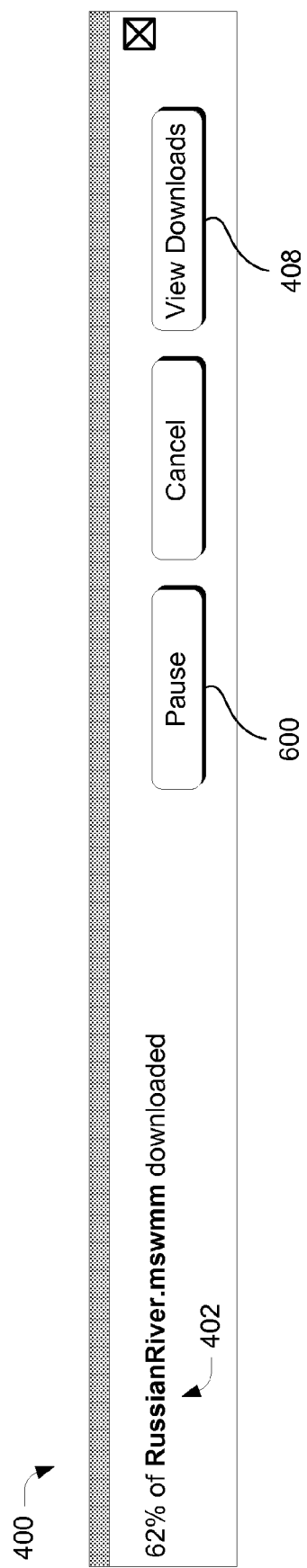
FIG. 6 illustrates a download bar in accordance with one or more embodiments.

FIG. 6 illustrates further aspects of the download bar 400, in accordance with one or more embodiments. In this particular example, a file download is in progress and the download notification area 402 includes an indication of the status of the file download process. The download bar 400 also includes a pause button 600 that, if pressed, causes the file download that is in progress to be paused. As discussed above, in some embodiments, actuating the view downloads button 408 can cause the download manager user interface 500 to be displayed.

Figure 7:
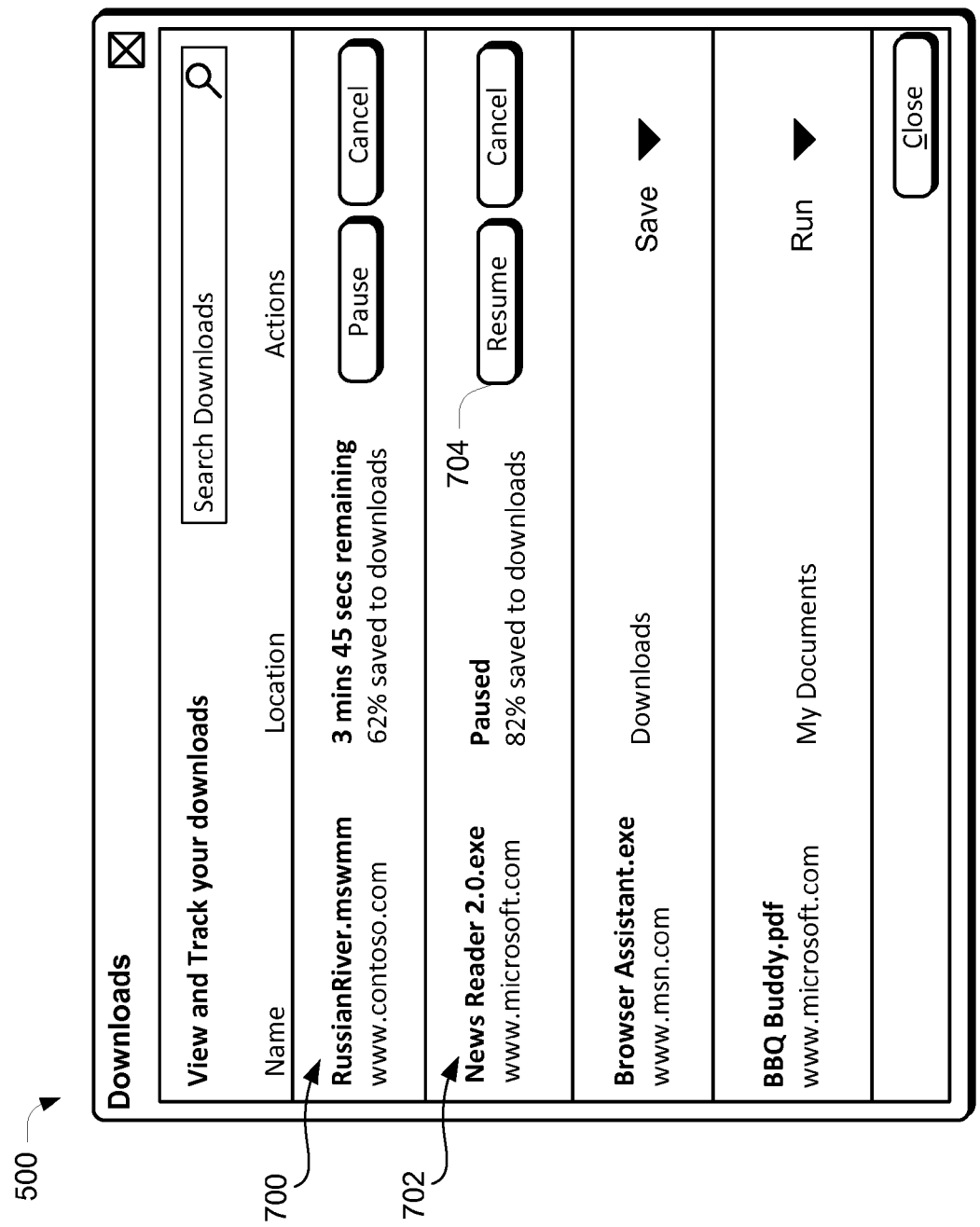
FIG. 7 illustrates a download manager user interface in accordance with one or more embodiments.

FIG. 7 illustrates further aspects of the download manager user interface 500, in accordance with one or more embodiments. In this particular example, the download manager user interface includes a file 700 that is currently in the process of being downloaded and a file 702 the download of which has been paused. The actions column associated with the file 700 includes a pause button and a cancel button (undesignated). The actions column associated with the file 702 includes a resume button 704. In some embodiments, the resume button 704 can be actuated to resume a download that has been interrupted, e.g., due to an actuation of the pause button 600 discussed with respect to FIG. 6. The resume button 704 can also be actuated to resume a download that has been interrupted for other reasons, such as the web browser 110 being closed by a user, the web browser or other application crashing, a loss of network connectivity, an interruption associated with the download source (e.g., a download server crash), and so on.

In at least some embodiments, an actuation of the resume button 704 can cause a resume request to be sent to a download source. For example, the download manager module 114 or the web browser 110 can generate the resume request and forward it to a resource (e.g., one of the web servers 118) that hosts the download file. In at least some embodiments, the resume request can include a variety of information about an interrupted file download, such as a file header that identifies the file, an indication of how much of the file was downloaded, a file version, and so on. The resource can receive the resume request and determine if the file download can be resumed. In at least some embodiments, if the file download can be resumed, a portion of the file that was not previously downloaded can then be downloaded.

Figure 8:
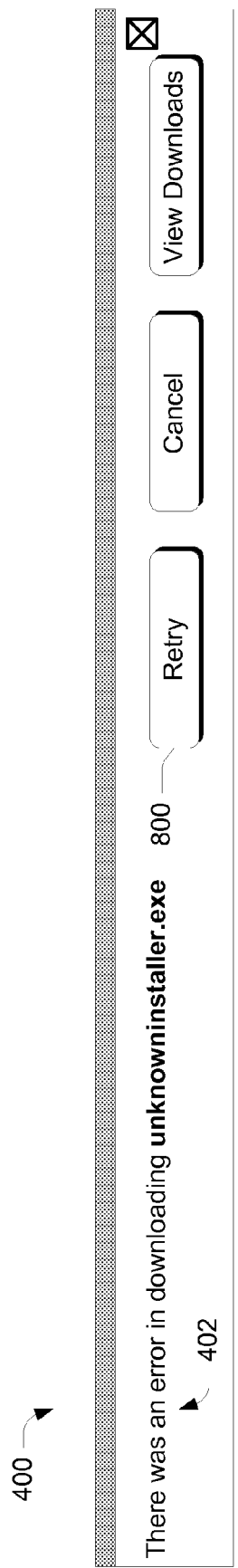
FIG. 8 illustrates a download bar in accordance with one or more embodiments.

FIG. 8 illustrates further aspects of the download bar 400, in accordance with one or more embodiments. In this particular example, a file download has failed and the download notification area 402 includes an indication that an error occurred during the file download process. The download bar 400 also includes a retry button 800 that, if pressed, causes a re-initiation of the download process. For example, actuating the retry button 800 can cause a resume download request for a file to be forwarded to a resource that hosts the file. While not expressly illustrated here, the download manager user interface 500 can be populated with this information, such as a notification that an error occurred during the file download and an option to resume the file download.

Figure 9:
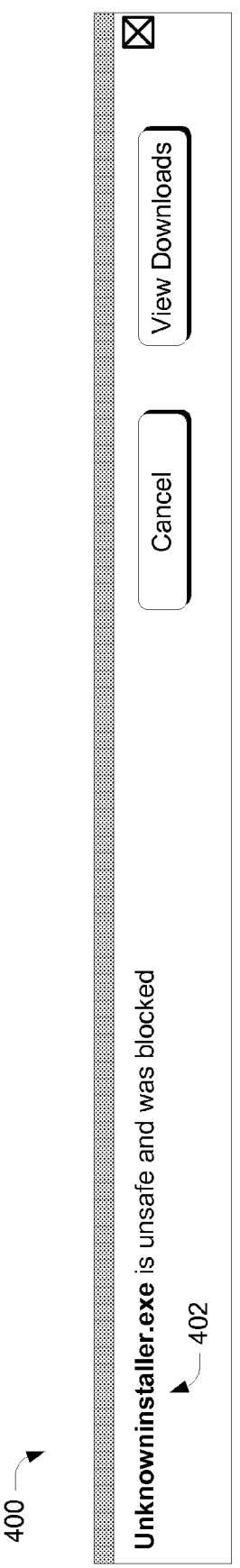
FIG. 9 illustrates a download bar in accordance with one or more embodiments.

FIG. 9 illustrates further aspects of the download bar 400, in accordance with one or more embodiments. In this particular example, a determination has been made that the file being downloaded is unsafe, and thus the download process has been blocked. The download notification area 402 includes an indication of this determination.

Figure 10:
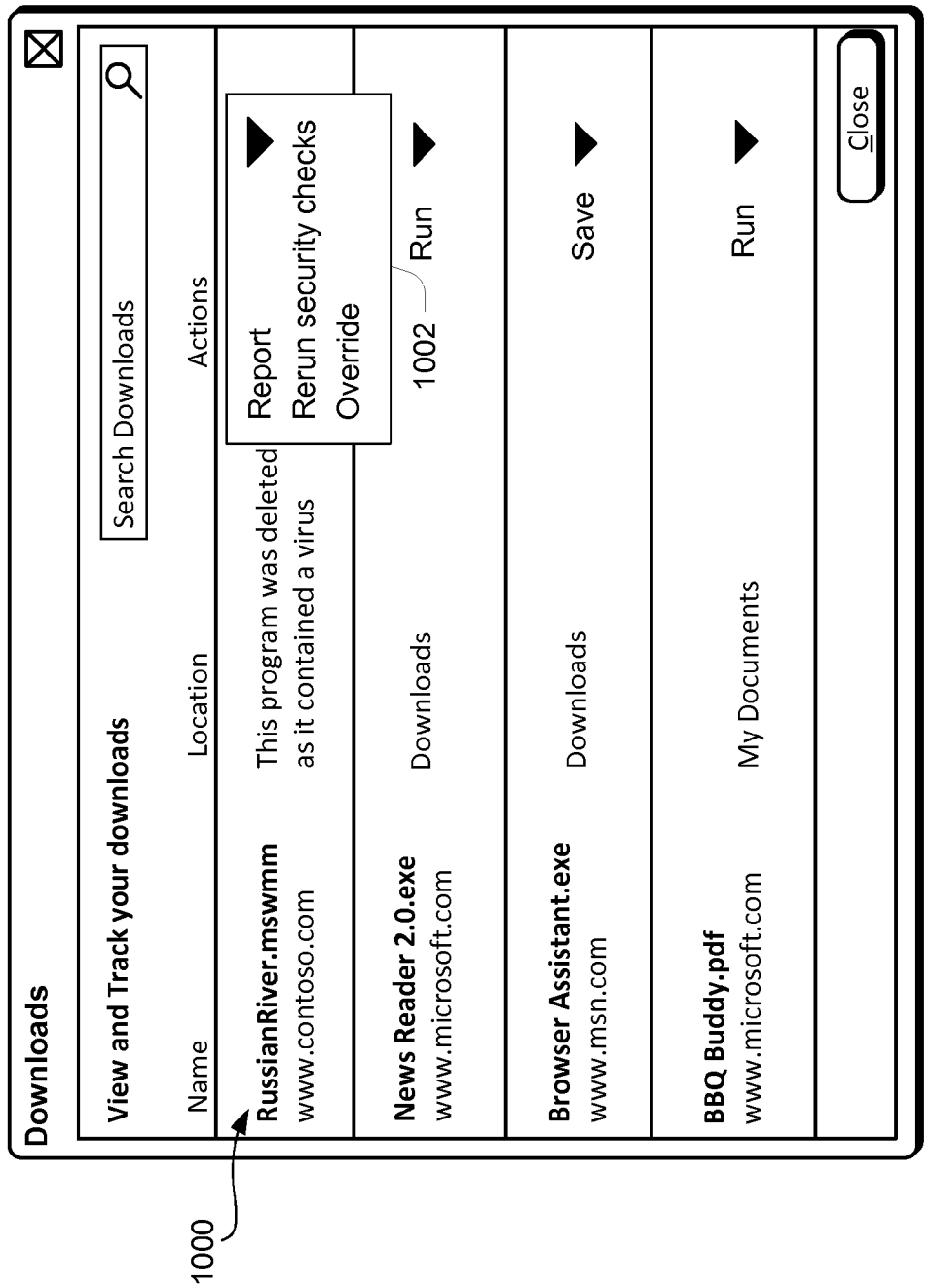
FIG. 10 illustrates a download manager user interface in accordance with one or more embodiments.

FIG. 10 illustrates further aspects of the download manager user interface 500, in accordance with one or more embodiments. In this illustrated example embodiment, the download manager user interface 500 includes a download file 1000 that has been deleted due to a determination that the file contained a virus. In some example embodiments, a file that is being downloaded is saved to a safe location that does not have access to other areas of a computing device. Thus, if it is determined that the file is unsafe, the file can be deleted from the safe location without putting other areas of the computing device at risk.

The download manager user interface also includes a security options menu 1002, which presents a variety of selectable options. In at least some embodiments, the security options menu includes a "report" option, a "rerun security checks" option, and an "override" option. The "report" option can be selected to cause information associated with a blocked download to be reported to a security resource, such as a local and/or remote security functionality. In at least some embodiments, information associated with a blocked download can be automatically reported independent of a selection of the "report" option.

The "rerun security checks" option can be selected to cause the desired download file to be re-evaluated based on a variety of different security-based criteria, e.g., the security criteria that were originally considered in blocking the download as unsafe. For example, if the security checks are rerun at a later date, updated information about the file may be available that enables a more accurate security-based determination to be made.

In at least some embodiments, the "override" option can cause the blocked download file to be downloaded despite having failed the security check. For example, even though a security functionality has made a determination that the file is not safe and thus recommends that the file be deleted, a user can select the "override" option to cause the file to be downloaded and/or maintained locally. In some embodiments, such as where a virus has been detected in a download file, the "override" option will not be available.

Example Methods

Figure 11:
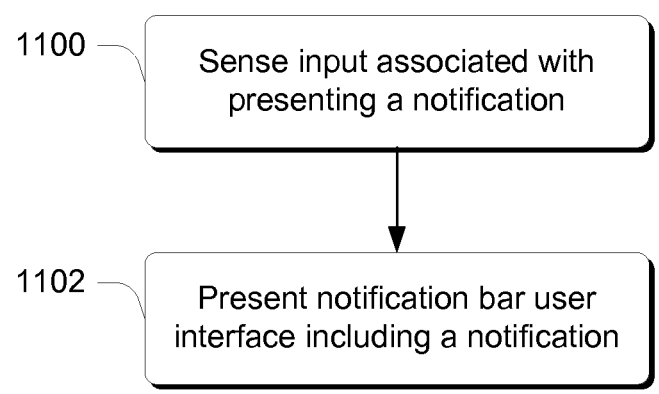
FIG. 11 is a flow diagram that describes steps in a method in accordance with one or more embodiments.

FIG. 11 is a flow diagram that describes steps a method in accordance with one or more embodiments. The method can be implemented in connection with any suitable hardware, software, firmware, or combination thereof. In at least some embodiments, the method can be implemented in software in the form of a web browser and/or a notification bar module, such as the ones described above.

Step 1100 senses an input associated with presenting a notification. Such input can comprise any suitable type of input. For example, some types of input can be received from third parties, such as a third-party website that attempts to take action with respect to a webpage to which a user has navigated and accessed with a web browser. Alternately or additionally, some types of input can be received from a user, such as an attempt to download a file.

Step 1102 presents, responsive to sensing the input, a notification bar user interface that includes a notification. Examples of notification bars are described above and below.

Figure 12:
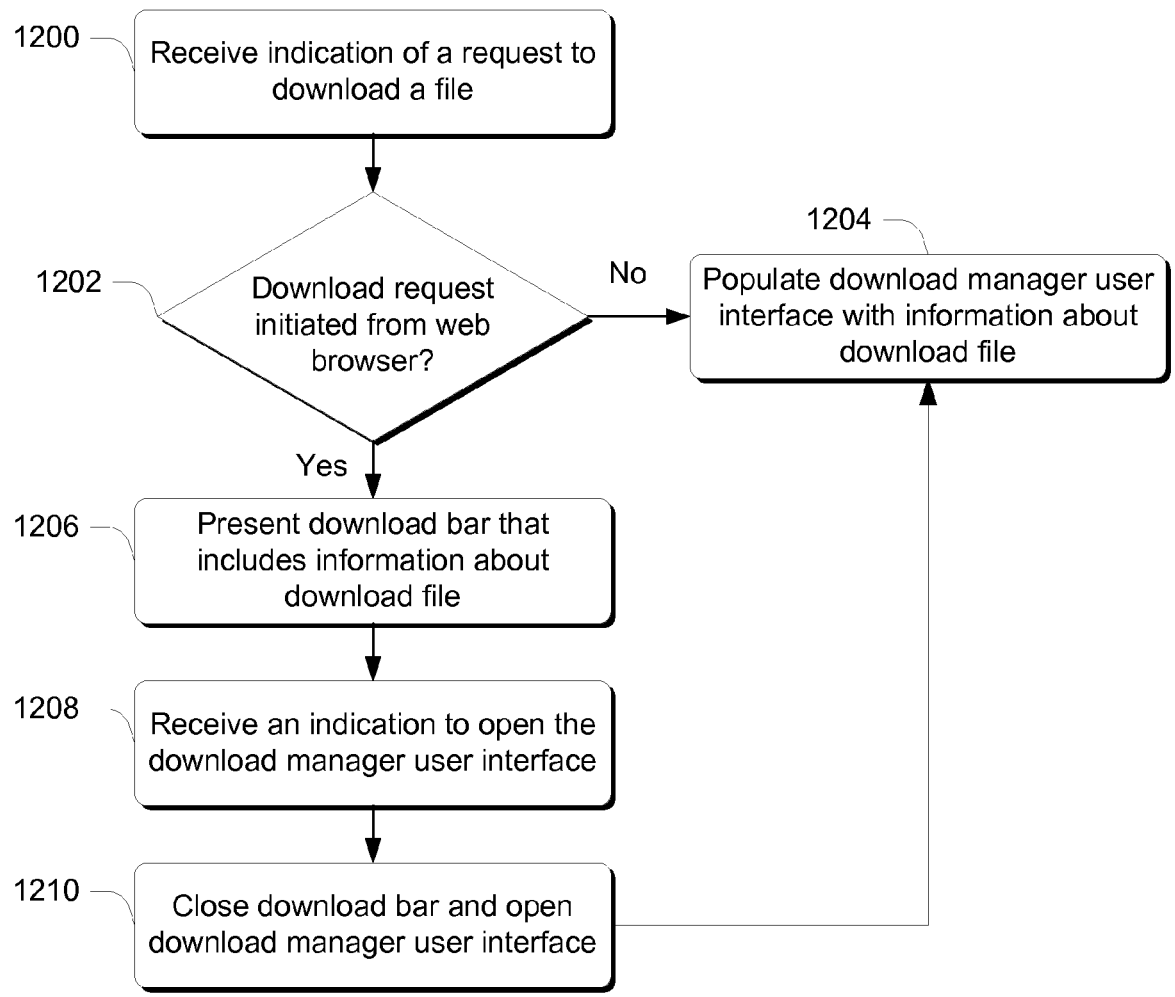
FIG. 12 is a flow diagram that describes steps in a method in accordance with one or more embodiments.

FIG. 12 is a flow diagram that describes steps a method in accordance with one or more embodiments. The method can be implemented in connection with any suitable hardware, software, firmware, or combination thereof. In at least some embodiments, the method can be implemented in software in the form of a web browser, a notification bar module, and/or a download manager module, such as the ones described above.

Step 1200 receives an indication of a request to download a file. For example, in some embodiments a user can indicate a desire to download a file, such as by clicking on a link included as part of a web page. Additionally or alternatively, a program or other functionality executing on a computing device can generate a request that a file be downloaded.

Step 1202 determines if the download request is initiated from a web browser. If the download request was not initiated from a web browser ("No"), step 1204 populates the download manager user interface with information about the download file. As discussed above and below, information about the download file can include status notifications concerning a download process, security notifications concerning the download file, selectable options for the download file, and so on.

If the download is initiated from a web browser ("Yes"), step 1206 presents a download bar that includes information about the download file. Step 1208 receives an indication to open the download manager user interface. For example, a user can select the view downloads button 408 to cause the download manager user interface to be launched. Step 1210 closes the download bar and opens the download manager user interface. Step 1204 populates the download manager user interface with information about the download file.

Alternatively, if the download manager user interface is already open when the indication of the download request is received (e.g., when step 1202 occurs), the download manager user interface will automatically be populated with this information.

In at least some embodiments, when a web browser is closed while a download is in progress, the download manager user interface 500 can be brought into focus. For example, if all open web browser windows are closed while a download is in progress and the download manager user interface 500 is not open, the download manager user interface 500 can be launched and populated with information about the download that is in progress. This allows a user to be reminded that the download is in progress and can present the user with download-related options, such as to continue the download, pause the download, cancel the download, and so on.

Figure 13:
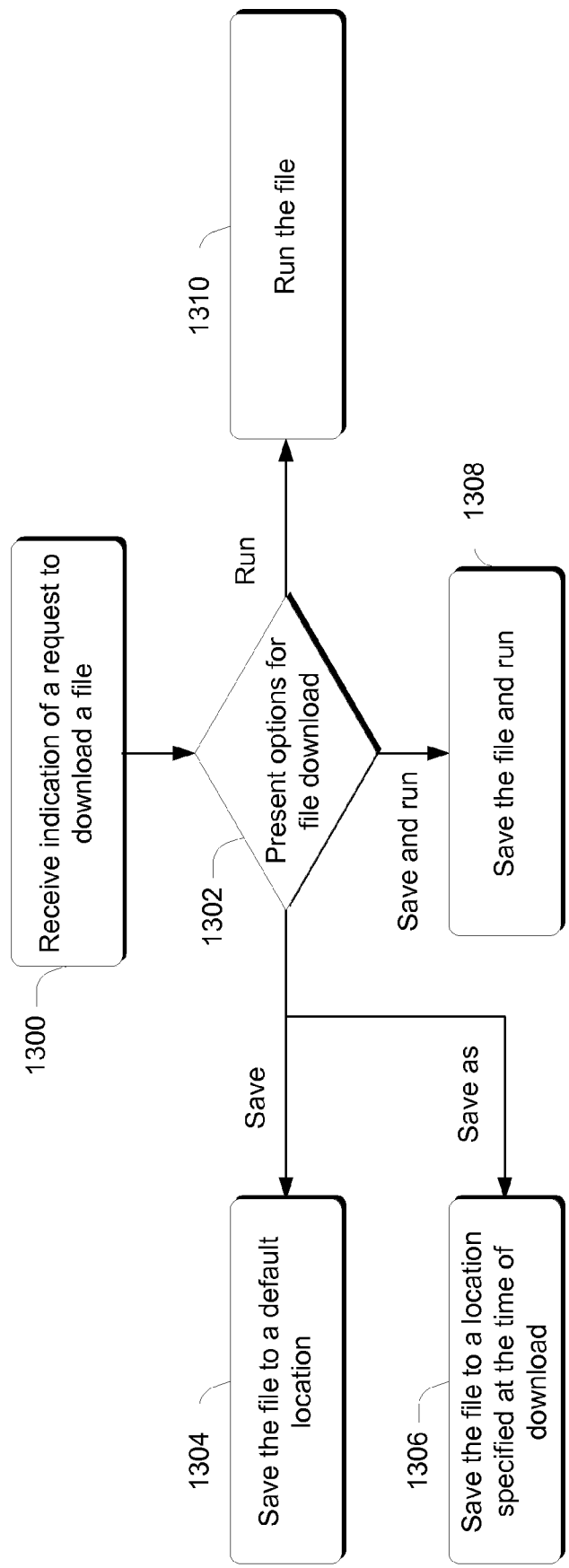
FIG. 13 is a flow diagram that describes steps in a method in accordance with one or more embodiments.

FIG. 13 is a flow diagram that describes steps a method in accordance with one or more embodiments. The method can be implemented in connection with any suitable hardware, software, firmware, or combination thereof. In at least some embodiments, the method can be implemented in software in the form of a web browser, a notification bar module, and/or a download manager module, such as the ones described above.

Step 1300 receives an indication of a request to download a file. Step 1302 presents options for the file download. In at least some embodiments, the options can be presented via the download bar and/or the download manager user interface. Also in at least some embodiments, the file can begin downloading while waiting for one of the options for the file download to be selected. For example, the file can begin downloading to a temporary file location that is safe and quarantined from other computing resources to avoid exposing the other computing resources to a possible security risk.

Step 1304 saves the file to a default location if the "Save" option is selected. In at least some embodiments, a default location can be specified (e.g., by a user or automatically by software or other functionality) where downloaded files can be saved and retrieved. If the "Save as" option is selected, step 1306 saves the file to a location specified at the time of the download. For example, a selection of the "Save as" option can cause a prompt to be presented that enables a user to specify a location for the file to be saved and/or a name for the file to be saved as.

If the "Save and run" option is selected, step 1308 saves the file and runs the file. For example, the file can be saved to a default location and then automatically run without any additional user interaction.

If the "Run" option is selected, step 1310 runs the file. In at least some embodiments, a selection of the "Run" option can cause the file to be saved locally to a temporary location and then run. Once the file is finished running (e.g., it is closed by a user), the file can be deleted from the temporary location. In some embodiments, this saves memory resources and time because the user does not have to locate and delete the file after it is finished running. Alternatively, selection of the "Run" option can cause the file to be run directly from a remote resource, e.g., a resource that hosts the desired download file. In at least some embodiments, running the file from the remote resource can occur even when a local copy of the file is not downloaded and/or saved locally.

In at least some embodiments, for example when the "Save" option, the "Save as" option, or the "Save and run" option is selected, the file being downloaded is saved directly to a storage location (e.g., a default and/or user-specified location) without the file first being cached and then moved from the cache location to the storage location.

Script

In some embodiments, an indication of a request to download a file (e.g., the indication received at step 1300) can be received responsive to execution of script. For example, a website can execute script on a user's computing device that can cause a file download to be requested. Before the file download can begin, one of the file download options can be selected, e.g., the options for the file download presented at step 1302. Thus, in some embodiments, the download bar can present the options for the file download and the file download can be initiated responsive to a selection of one of the options. In at least some embodiments, this can allow a script-requested file download to begin responsive to a single selection of a file download option, rather than presenting a user with multiple windows and/or options for selection prior to beginning the file download.

Add-Ons

In at least some embodiments, an indication of a request to download a file (e.g., the indication received at step 1300) can be received from an add-on. In some embodiments, an add-on is software or other piece of executable code that can enhance the functionality of an application. Examples of an add-on include a plug-in, a software extension, a software enhancement module, and so on. In at least some embodiments, a file download functionality is provided that enables an add-on to access the functionality of the download manager and/or the download manager user interface without the add-on utilizing the extension-handling functionality of a web browser. Thus, in some embodiments, an add-on can access the download manager to request that a file be downloaded. For example, the add-on can provide the download manager with a URL for a download file. In some embodiments, a user can be presented with options for handling the file download, e.g., via the download bar and/or the download manager user interface.

Figure 14:
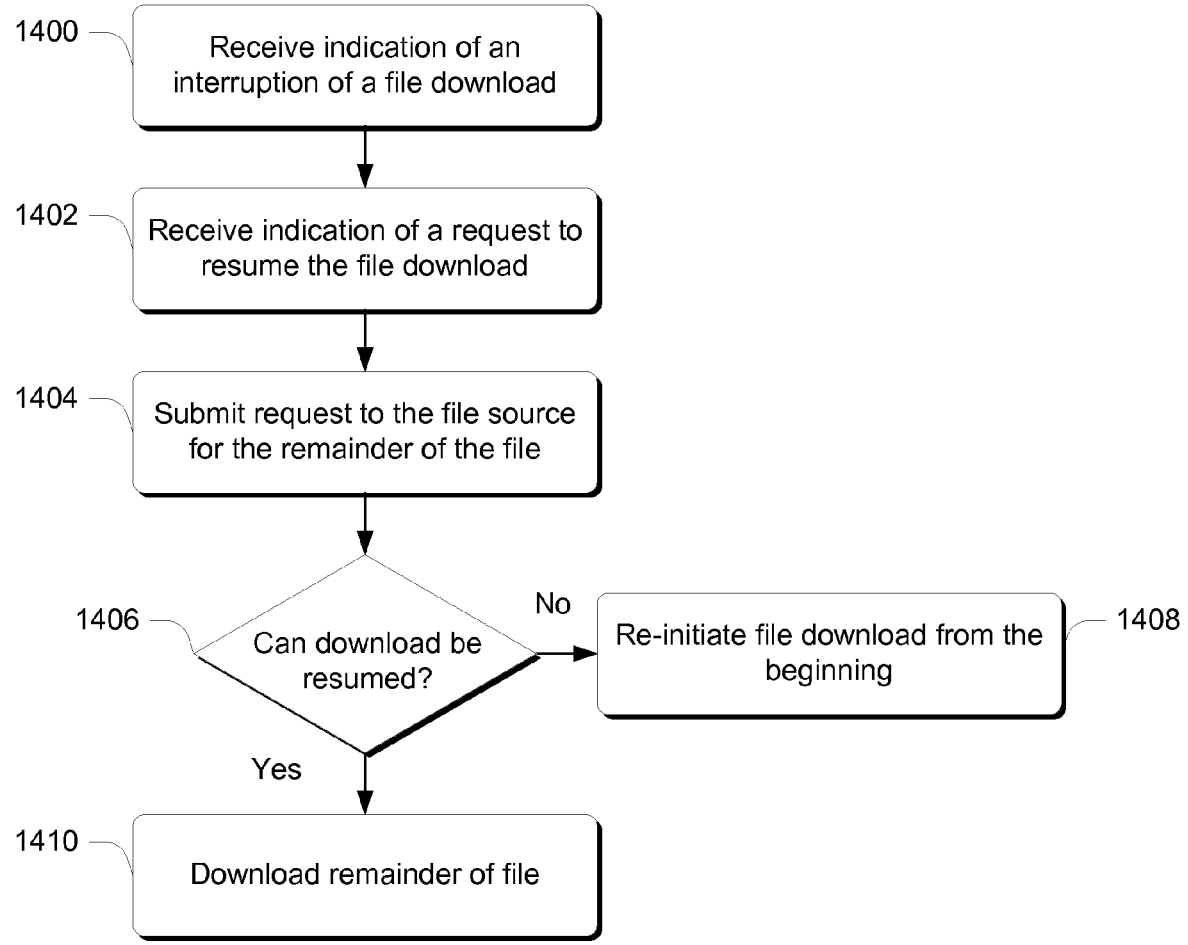
FIG. 14 is a flow diagram that describes steps in a method in accordance with one or more embodiments.

FIG. 14 is a flow diagram that describes steps a method in accordance with one or more embodiments. The method can be implemented in connection with any suitable hardware, software, firmware, or combination thereof. In at least some embodiments, the method can be implemented in software in the form of a web browser, a notification bar module, and/or a download manager module, such as the ones described above.

Step 1400 receives an indication of an interruption of a file download. For example, the indication can be responsive to a user actuation of a pause button included as part of the download bar and/or the download manager user interface. In at least some embodiments, pausing the file download can cause a network connection to a source of the file being downloaded to be closed. Alternatively, the indication of the interruption of the file download can be responsive to a loss of connectivity to a source of the file. Example reasons for a loss of connectivity can include a loss of a network connection, a loss of computing device power, a software (e.g., web browser) crash, the web browser being closed by a user, and so on.

Step 1402 receives an indication of a request to resume the file download. For example, the indication can be responsive to a user actuation of a resume button included as part of the download bar and/or the download manager user interface.

Step 1404 submits a request to the file source for the remainder of the file. In at least some embodiments, the request can be in the form of a get file request that includes information about the file, such as a file header, how much of the file was already downloaded, and so on. Step 1406 determines if the file download can be resumed. If the file download cannot be resumed ("No"), step 1408 re-initiates the file download from the beginning. For example, the file source can indicate that the request to resume the download does not include sufficient information to resume the download and thus the file download will be initiated from the beginning. If the file download can be resumed ("Yes"), step 1410 downloads the remainder of the file.

Figure 15:
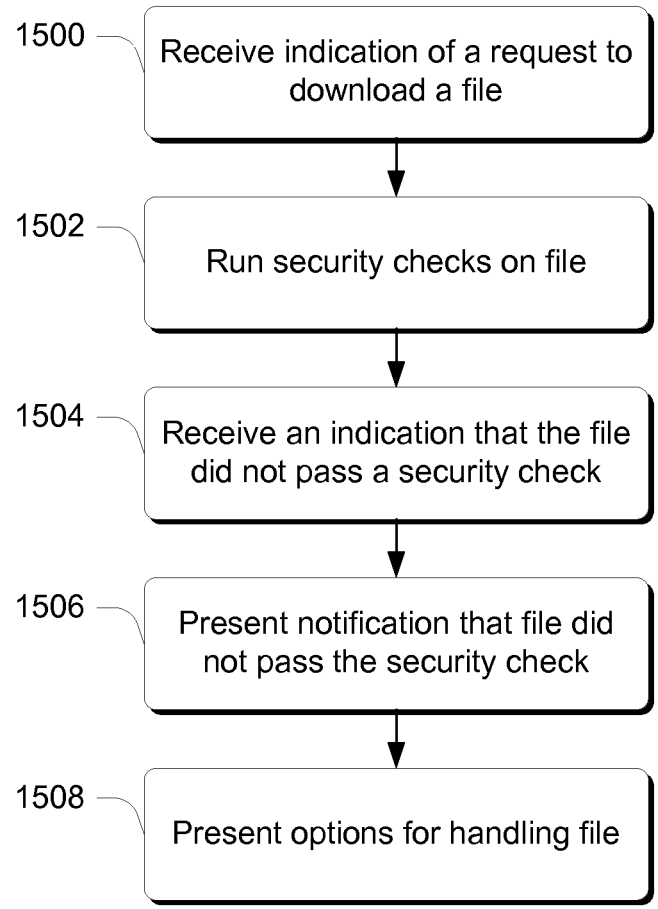
FIG. 15 is a flow diagram that describes steps in a method in accordance with one or more embodiments.

FIG. 15 is a flow diagram that describes steps a method in accordance with one or more embodiments. The method can be implemented in connection with any suitable hardware, software, firmware, or combination thereof. In at least some embodiments, the method can be implemented in software in the form of a web browser, a notification bar module, and/or a download manager module, such as the ones described above.

Step 1500 receives an indication of a request to download a file. Step 1502 runs security checks on the file. A number of different security criteria can be applied to a file as part of the security checks. For example, a signature can be generated for the download file and compared to file signatures for files that are known to be dangerous, e.g., files that are associated with a virus, malware, or other harmful activities.

In some embodiments, 4 different security checks associated with a download file can be performed. The first security check relates to a URL of the download file and seeks to determine if the URL is known to be safe or not by comparing the URL to a list of known URLs. The second security check inspects the requested download file to determine if the file includes and/or is associated with a virus or other malware. The third security check compares a signature for the requested download file to known file signatures to determine if the file is known to be unsafe.

Finally, the fourth security check utilizes a list of executable files. In at least some embodiments, a hash of a requested executable download file can be generated and then compared with file hashes in the list of executable files. In some embodiments, the list of executable files and their hashes can be maintained at a remote resource, e.g., a web server. A variety of different results can be generated based on this comparison, such as:

Good—the download file is indicated on the list as safe.

Not supported—the file type of the requested download file is not supported on the list.

Bad—the requested download file is known to be associated with malware.

Unknown—the download file is not on the list.

Vulnerable—the download file has a known vulnerability.

Errors (file-specific)—the download file has an error. Examples of the error include:

a. Failure to generate a usable hash value b. XML associated with the download file is corrupt c. Lookup of the download file has failed Errors (not file specific). Examples of these errors include:

a. A service that hosts the list is unreachable b. The client requesting the download file is not supported.

Returning to the method, step 1504 receives an indication that the file did not pass a security check. In at least some embodiments, the indication can be received from a local security resource or a remote security resource. Step 1506 presents a notification that the file did not pass a security check. For example, the notification can be presented via the download bar and/or the download manager user interface. In at least some embodiments, even if a file fails multiple security checks, a single security notification and security-related recommendation can be presented via the download bar and/or the download manager user interface.

Step 1508 presents options for handling the file. In some embodiments, options for handling the file can include cancelling the file download, deleting the file, reporting the file as safe or unsafe, rerunning one or more security checks, overriding the failed security check, and so on.

Having described an example method that can be utilized in accordance with one more embodiments, consider now an example system that can be utilized to implement one or more embodiments.

Example System

FIG. 16 illustrates an example computing device 1600 that can be used to implement the various embodiments described above. Computing device 1600 can be, for example, computing device 102 or web server 118 of FIG. 1.

Computing device 1600 includes one or more processors or processing units 1602, one or more memory and/or storage components 1604, one or more input/output (I/O) devices 1606, and a bus 1608 that allows the various components and devices to communicate with one another. Bus 1608 represents one or more of any of several types of bus structures, including a memory bus or memory controller, a peripheral bus, an accelerated graphics port, and a processor or local bus using any of a variety of bus architectures. Bus 1608 can include wired and/or wireless buses.

Memory/storage component 1604 represents one or more computer storage media. Component 1604 can include volatile media (such as random access memory (RAM)) and/or nonvolatile media (such as read only memory (ROM), Flash memory, optical disks, magnetic disks, and so forth). Component 1604 can include fixed media (e.g., RAM, ROM, a fixed hard drive, etc.) as well as removable media (e.g., a Flash memory drive, a removable hard drive, an optical disk, and so forth).

One or more input/output devices 1606 allow a user to enter commands and information to computing device 1600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments provide a download bar user interface control that is designed to help users maintain focus on their browsing activities, while offering notifications regarding a file download. In at least some embodiments, the download bar user interface control is non-modal and is presented at a location within the browsing field-of-view that is selected to reduce user distraction. Thus, in some embodiments the download bar user interface control allows a user to continue browsing activities while the user views notifications concerning a file download activity, e.g., the progress of a file download. Various embodiments also provide a download manager user interface that enables multiple download-related tasks to be performed. In at least some embodiments, the download manager user interface is presented responsive to input to the download bar user interface control. Further to some embodiments, the download bar user interface control can be closed responsive to the download manager user interface being presented and download-related notifications and options transferred from the download bar user interface control to the download manager user interface.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:

one or more processors; and one or more computer readable storage media embodying computer readable instructions that responsive to execution by the one or more processors implements:

a notification bar module that is configured to implement a download bar user interface control for use with a web browser, the download bar user interface control being non-modal such that interaction with content rendered by the web browser is allowed to continue independent of a selection via the download bar user interface control and being configured to:

be presented adjacent a content rendering area of the web browser such that the content rendering area of the web browser is not obscured by the download bar user interface control and in response to an indication of a request to download a file;

be closed responsive to an input received via the download bar user interface control; and present download-related information and one or more selectable download-related options; and a download manager module that is configured to implement a download manager user interface, wherein the download manager user interface is configured to be presented responsive to a selection of one of the one or more selectable download-related options presented within the download bar user interface control and is configured to be populated with the download-related information and additional download-related options, the additional download-related options of the download manager user interface including security options associated with downloading the file, the security options including an option to report a result of a security check of the file during download, an option to rerun a particular security check, and an option to download the file responsive to determining that the file failed one or more security checks.

2. The system of claim 1, wherein the request to download the file comprises a script-initiated file download.

3. The system of claim 1, wherein the one or more selectable download-related options presented in the non-modal download bar user interface control include a selectable option to save a file download.

4. The system of claim 1, further comprising tracking a file download that is in progress via the download manager user interface in an event that the web browser is closed, the tracking including presenting the download manager user interface in response to the web browser being closed and wherein the download-related information comprises a progress notification regarding a file download.

5. The system of claim 1, wherein the download bar user interface control is configured to be closed responsive to an indication of the download manager user interface being opened.

6. The system of claim 1, wherein the download bar user interface control is configured to be associated with a particular security domain, and the download bar user interface control is configured to be closed responsive to an indication of a navigation of the web browser away from the particular security domain.

7. The system of claim 1, wherein the download-related information comprises a selectable option that, if selected, causes a file to be run from a source of the file without saving the file to the one or more computer readable memories.

8. The system of claim 1, wherein the download-related information comprises a selectable option that, if selected, causes a file download that has been interrupted to be resumed.

9. The system of claim 8, wherein the download manager module is further configured to cause the file download that has been interrupted to be resumed by submitting a get file request to a source of the file.

10. The system of claim 1, wherein the notification bar module is further configured to present a single security-related notification in an event that a requested download file fails multiple security checks.

11. A computer-implemented method comprising:
receiving an indication of a request to download a file via a web browser;
presenting, responsive to receiving the indication of the request, a download bar user interface control that presents download-related information and one or more selectable download-related options, the download bar user interface control being:
non-modal such that interaction with content rendered by the web browser is allowed to continue independent of a selection via the download bar user interface control; and
presented adjacent a content-rendering area of the web browser such that the content-rendering area of the web browser is not obscured by the download bar user interface control; and
presenting, responsive to a selection of one of the one or more selectable download-related options included within the download bar user interface control, a download manager user interface that presents the download-related information previously presented in the download bar user interface control, additional download-related options related to the file, and information related to one or more previously-downloaded files, the additional download-related options of the download manager user interface including security options associated with downloading the file, the security options including an option to report a result of a security check of the file during download, an option to rerun a particular security check, and an option to download the file responsive to determining that the file failed one or more security checks.

12. The computer-implemented method of claim 11, further comprising:
receiving an indication of a selection of one of the additional download-related options presented by the download manager user interface; and
performing security actions related to the download of the file.

13. The computer-implemented method of claim 11, wherein the one or more selectable download-related options comprises a resume option that, if selected, causes a request to be submitted to a source of the file, wherein the request comprises a request to resume an interrupted download of the file.

14. The computer-implemented method of claim 13, wherein the interrupted download of the file comprises a download of the file that was paused responsive to a selection of one of the download-related options.

15. The computer-implemented method of claim 13, wherein the interrupted download of the file comprises a download of the file that was paused responsive to the web browser being closed.

16. The computer-implemented method of claim 11, wherein the indication of the request to download the file is received responsive to one or more of script executing on a computing device or a file download request from an add-on.

17. The computer-implemented method of claim 11, further comprising initiating a download of the file to a temporary and safe location prior to a selection of at least one of the selectable download-related options.

18. The computer-implemented method of claim 11, further comprising:
receiving an indication that the file did not pass multiple security checks; and
presenting, via the download bar user interface control, a single security-related notification based at least in part on the indication that the file did not pass the multiple security checks.

19. A computer-implemented method comprising:
presenting, responsive to receiving an indication of a request to download a file, a download bar user interface control that presents download-related information, wherein the download bar user interface control is non-modal such that an input via the download bar user interface control does not preclude interaction with content rendered by a web browser, is presented adjacent a content-rendering area of the web browser such that the content-rendering area of the web browser is not obscured by the download bar user interface control, and the download bar user interface control includes one or more selectable download-related options; and
presenting, responsive to a selection of one of the one or more selectable download-related options included within the download bar user interface control, a download manager user interface, wherein the download manager user interface presents at least the download-related information previously presented in the download bar user interface control and is configured to present additional download-related options that include security options associated with downloading the file, the security options including an option to report a result of a security check of the file during download, an option to rerun a particular security check, and an option to download the file responsive to determining that the file failed one or more security checks.

20. The computer-implemented method of claim 19, further comprising tracking a file download that is in progress via the download manager user interface in an event that the web browser is closed, the tracking including presenting the download manager user interface in response to the web browser being closed.

* * * * *